Patented July 27, 1954

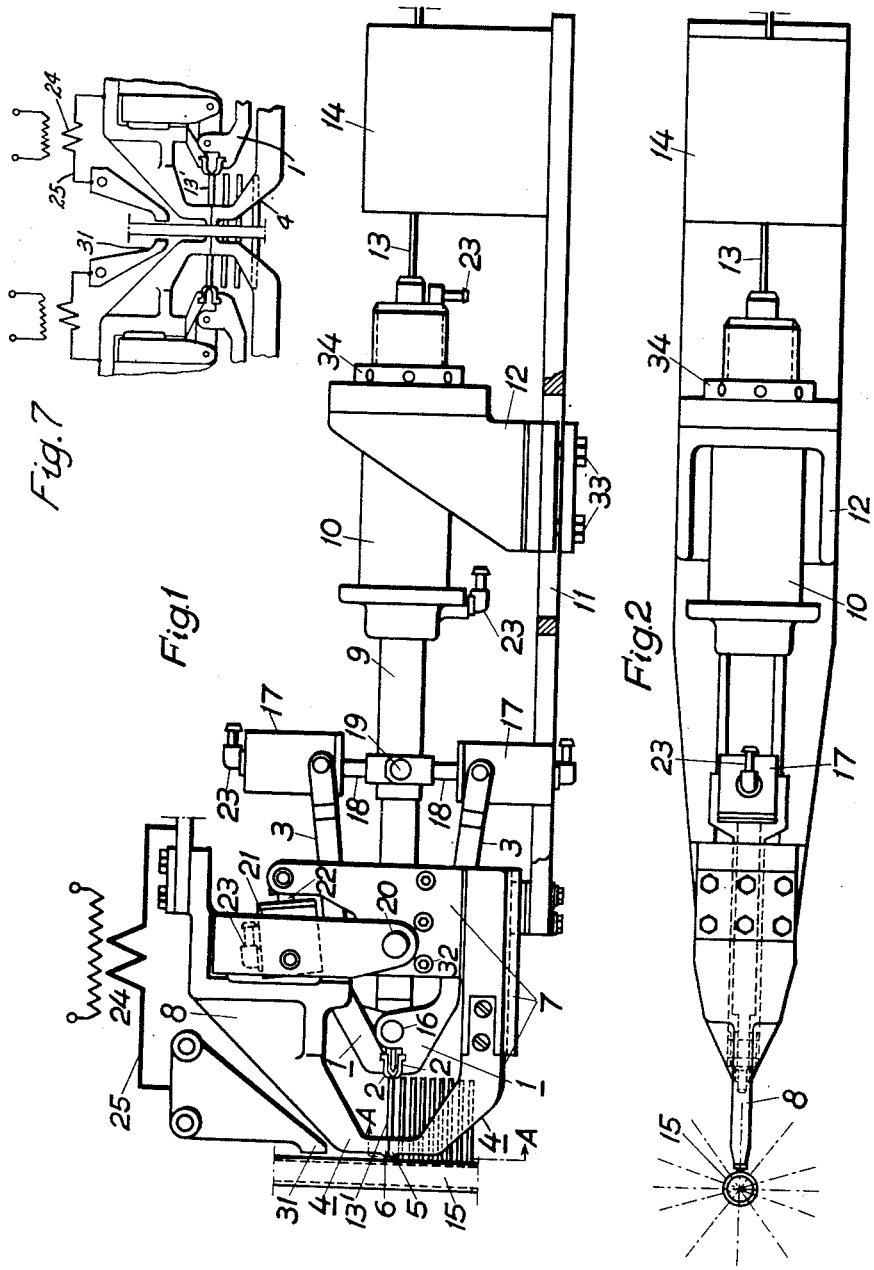

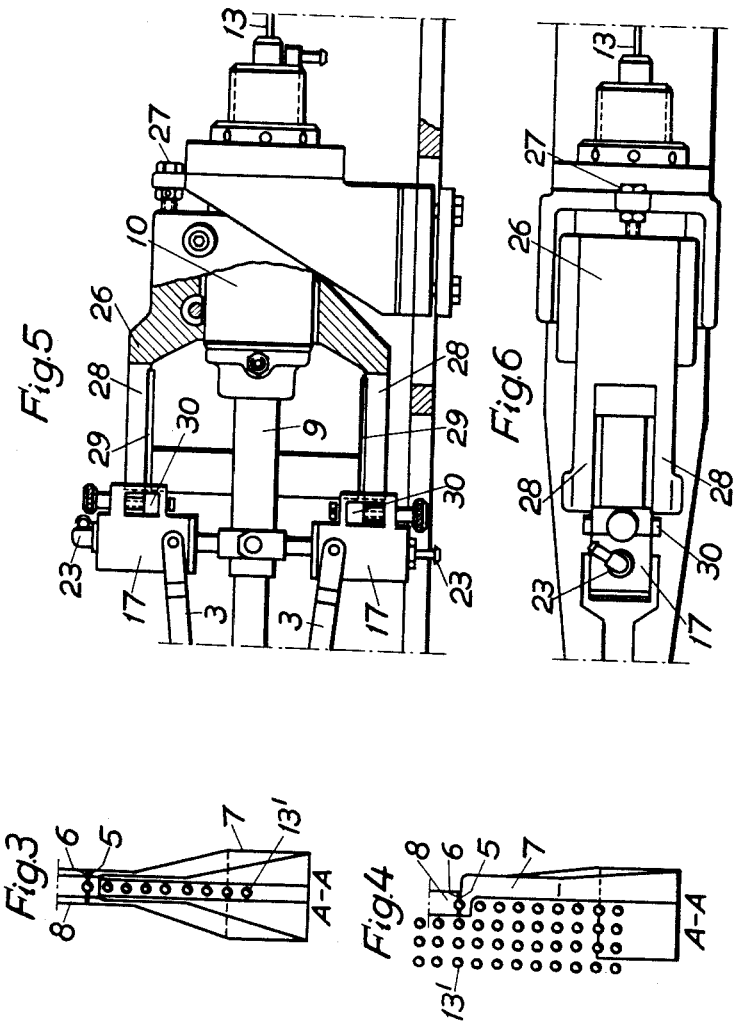

2,685,017

UNITED STATES PATENT OFFICE 2,685,017

APPARATUS FOR WELDING UNDER PRESSURE STUDS OR BOLTS TO A CURVED OR PLANE SURFACE

Bror G. A. Anderson and Nils Wallenborn, Stockholm, Sweden, assignors to Allmanna Svenska Elektriska Aktiebolaget, Vasteras, Sweden, a corporation of Sweden Application October 4, 1950, Serial No. 188,336

Claims priority, application Sweden October 18, 1949

18 Claims. (Cl. 219—4)

The problem of welding metallic bolts, studs or the like to a curved or plane member of steel by means of pressure welding arises in many industrial processes, for example in the manufacture of boiler equipments wherein a great number of studs are welded concentrically to a steel tube in order to increase the transmission of heat by the tube. In such processes it is a great advantage if a continuous wire, wound on a reel, can be employed instead of individual studs, and the present invention has for its object the provision of a welding apparatus which can be employed in this way.

According to the invention apparatus for the electric butt welding of metallic studs formed from wire material to a curved or plane metallic surface of a workpiece, is characterized by the fact that the apparatus comprises seizing and cutting means for moving the wire material through a straightening means towards the workpiece and cutting a stud therefrom of the desired length and pressure fluid actuated welding tongs for supplying the welding current and for applying welding pressure to the cut off stud.

A plurality of such apparatus may be combined to form a multiple butt welding equipment which can be arranged to conform to the shape of the workpiece (for example around a tubular member, or after replacing the jaws for welding rods on sheet). In this way a great flexibility is obtained in the application of the equipment for welding operations on workpieces of greatly varying shape, whereby the economical use of the welding equipment is considerably improved. Another great advantage is that all welding operations may be effected at once and be controlled by a central device.

In welding rods onto sheets it is possible to weld from both sides by means of two opposed apparatus, in which case a special elastic auxiliary contact is arranged adjacent to one of the welding jaws and electrically insulated therefrom, whereby the two poles of the transformer connected to the jaw and to the auxiliary contact, respectively, bring about a series welding with the opposed apparatus, provided that the polarity of the transformer of the latter is reversed. Thus the welding is effected without the occurrence of heavy inductive losses which otherwise are unavoidable in series welding with a transformer because of the iron mass interconnected in the circuit. The auxiliary contacts of the opposed apparatus should be arranged directly opposite each other, so that the current path between them is reduced to a minimum and if the welding is performed near the edge of the sheet, the auxiliary contacts should make contact with each other beyond the edge of the sheet. In these ways the required power required for welding is greatly reduced.

In welding operations on tubes, however, the welding is performed as a pure series welding between two apparatus which are not arranged diametrically opposed. In this case the different apparatus are suitably arranged on a ring through which the tube passes so that each apparatus can be easily displaced peripherally. The required radial adjustment of each apparatus is effected by means to be described below.

The invention will now be described in detail with reference to the accompanying drawings which show one embodiment of the invention. It will be understood that the various structural details may be modified without exceeding the scope of the invention.

In the drawings:

Fig. 1 is an elevation of one form of the invention.

Fig. 2 is a plan view.

Figs. 3 and 4 are schematic front views of embodiments of the welding jaws for welding extensions, studs or the like on curved or on plane surfaces, respectively, and Figs. 5 and 6 are an elevation and a plan view, respectively, of an embodiment of a mechanical device for limiting the cutting movement of the seizing and cutting means during the feeding movement.

Fig. 7 is a detail view showing a modification.

The welding unit comprises a combination seizing and cutting means 1 having edges 2 and legs 3 and welding tongs 4 having jaws 5 and 6 and arms 7 and 8. These means are mounted as described below on a hollow piston rod 9 which slides within a cylinder 10. The cylinder 10 is fixed on a support 12 adjustable along a stationary frame 11. The initial material for the welding is a wire 13, which is carried by a reel (not shown) through a straightening means 14, through the piston rod 9, the edges 2 and the welding jaws 5 and 6 towards the work piece 15.

The legs 3 of the seizing and cutting means 1 are pivoted on a pin 16 on the piston rod 9. The legs 3 are operated by cylinders 17, which are supported by piston rods 18 articulated on the hollow piston rod 9 on pins 19. The one arm 7 (or pair of arms) of the welding tongs 4 is mounted adjustably on the hollow piston rod 9 and insulated therefrom. The wire is held between the welding jaw 5 on the arm 7 and the welding jaw 6 on the arm 8, which arm is pivoted on a pin 20 on the arm 7. Pivoted in the arm 8, is a cylinder 21 having a piston rod 22 which in turn is pivoted in the upper part of the arm 7. Pipe connections 23 lead to a central control device, not shown. 24 is the welding transformer and 31 an auxiliary contact which is used in welding to plane surfaces.

In Figs. 1 and 2 the apparatus according to the invention is shown in the position that the different parts take up immediately after the welding of a stud 13 has been completed.

The apparatus functions as follows:

The cylinders 17 and the cylinder 21 are influenced by compressed air or other suitable pressure fluid in such a way that the edges of the seizing and cutting means 1 and the welding tongs 4 open. Thereafter, compressed air or other suitable pressure fluid is supplied to the cylinder 19, so that the hollow piston rod 9 and with it the whole system consisting of the seizing and cutting means and the welding tongs 4 is moved to the right (on the drawing) a distance which corresponds to the desired length of the stud plus the portion of the stud consumed in the welding operation. In this way the welding jaws of the arm 7 (or pair of arms) is moved clear of the work-piece 15 so that the latter may be lowered a distance corresponding to the desired pitch between the studs. Alternatively the work-piece may be stationary, in which case the welding apparatus then is lowered or raised a corresponding distance. The open edges 2 and welding jaws 5 and 6 slide along the stationary wire 13 projecting from the hollow piston rod 9. When the piston rod 9 reaches its right hand final position, fluid under low pressure is supplied to the cylinders 17 and the cylinder 21, whereupon the edges 2 and the welding jaws 5 and 6 seize the wire with low pressure. High pressure fluid is now admitted to the cylinder 19 in such a manner that the piston rod 9 moves to the left, whereupon said edges and welding jaws draw the wire with them, until it makes contact with the work-piece. In this moment the pressure within the cylinders 17 and the cylinder 21 is increased whereupon the welding jaws of the tongs 4 hold the wire fast, and the edges 2 cut the wire so that a stud or pin of desired length is obtained. The welding circuit is then closed for a predetermined time, and the welding current flows from the one pole of the transformer 24 through conductors 25 and the arm 8 to the stud and returns through the work-piece 15 to the other pole of the transformer. When the welding is finished, the working cycle is repeated in the above manner.

The timing and duration of the different operations is controlled automatically by an impulse sender, e. g. by a mechanically or otherwise driven rotating cam disc, which actuates the valves of the different cylinders and the contactors for the welding current in proper sequence. This impulse sender may be common to a plurality of welding apparatus and is suitably driven by the same motor which brings about the movement of the workpiece or apparatus to a new welding position.

The timing of the different operations may be arranged so that the wire is cut off before it comes in contact with the work-piece, and on continued movement of the cut off stud the latter will lie at a short distance from the stationary wire. In this way the passage of leakage currents from the stud 13' to the wire 13 is prevented.

As an alternative to supplying the cylinders 17 and 21 with low pressure fluid during the operation of moving the wire 13 towards the workpiece, the cylinders 17 may each be provided with a mechanical control means, which makes possible the use of full pressure in the cylinders 17 and 21 during the feeding movement of the wire itself. By aid of this control means the movement of the legs 3 is partly controlled, so that the edges 2 only penetrate the wire a certain adjustable depth during the feeding movement of the wire, so that they do not cut off the wire until the feeding movement has been fully completed or completed to a desired degree. If, as mentioned above, it is desired to obtain a short distance between the cut off stud and the wire when the welding circuit is closed, the whole feeding movement should comprise the sum of the length of the cut off stud, the said short distance and the portion of the stud consumed during the welding operation.

One example of an embodiment of this control means is illustrated in Figs. 5 and 6. On the cylinder 19 there is arranged a sleeve 26 slidable in axial direction. The position of the sleeve 26 relative to cylinder 19 may be adjusted by a set screw 27. This sleeve carries fork-shaped arms 28 extending parallelly with the piston rod 9 to the cylinders 17. The arms 28 have sliding surfaces 29, and the cylinders 17 are provided with adjustable sliding pieces 30, which are adapted to slide on the sliding surfaces 29. When the seizing and cutting means 1 together with the welding tongs 4 (Fig. 1) move forwards (to the left on the drawing), the movement of the cylinders 17 is limited so that the edges 2 only penetrate the wire to a certain predetermined depth. When the combined means 1 and 4 reach a predetermined position the sliding pieces 30 leave the sliding surfaces 29, so that the legs 3 may diverge and the wire is cut off as the fluid pressure in the cylinders 17 is then fully operative. The control means may be set so that the wire is cut off before the cut off stud 13' contacts the work-piece, as previously mentioned. The closed edges 2 of the seizing and cutting means 1 constitute under continued movement a very advantageous abutment for the cut off stud 13'.

Suitable embodiments of the welding tongs with welding jaws 5 and 6 for welding studs to tubes or curved surfaces and to plane sheet, respectively, are shown in Figs. 3 and 4 representing views taken along the line A—A on Fig. 1 in the direction of the arrows. The arms 7 (Fig. 3) and the arm 7 (Fig. 4) respectively, are constructed in both cases so that they do not make contact with the studs already welded.

For welding studs to plane sheet, the apparatus is provided with an auxiliary contact insulated from the tongs 4 and, diagrammatically shown by 31, which contact resiliently engages the work-piece and is connected to the second pole of the transformer 24, thus constituting the return conductor for the welding current. The auxiliary contact 31 may be adjustably fixed (i. e. spring operated or operated by a pressure cylinder for obtaining the required contact pressure) on the arm 8 or on the transformer or another portion of the apparatus. In welding one or more pairs of opposed studs to both sides of the sheet, the auxiliary contacts are arranged so that they make contact with the work-piece opposed to each other. By this way a series welding of one welding apparatus in co-operation with the opposed welding apparatus is accomplished, provided that the polarity of the transformer of the latter is inversed. Such an arrangement is shown in the detail view Fig. 7, where welding apparatus comprising opposed welding tongs 4, and auxiliary contacts 31 are provided for welding the studs directly opposite each other on opposite surfaces of the workpiece.

The auxiliary contacts 31 furthermore are arranged so that they make direct contact with each other outside the sheet, if the studs are welded near the edge of the sheet. The welding jaws are suitably constructed so that they can easily be replaced in the transition from welding studs on a plane surface to welding on a curved surface and vice versa.

In order to vary the length of the studs, the screws 32 which secure the arm 7 to the piston rod 9 have to be loosened, and the system 4 displaced to the right or left according as to whether shorter or longer studs are desired, whereafter the system is secured in the new position. Screws 33 on the frame 11 are then loosened on the support 12, which latter, together with the cylinder 10, is displaced a corresponding amount in the direction opposite to the adjustment of system 4. As an alternative to displacing cylinder 10 in this manner the right hand wall of the cylinder 10 may be adjustable in the axial direction by means of a threaded ring 34 for limiting the return movement of the system if shorter studs are desired, whereby the necessary quantity of pressure fluid can be greatly reduced. The welding apparatus may comprise a device for holding the wire 13 after a stud has been cut off.

We claim as our invention:

1. Apparatus for the electric butt welding of metallic studs formed from wire material to a curved or plane surface of a workpiece, comprising, in one unit, a combination seizing and cutting means for straightening the wire material and for advancing it towards the workpiece and for cutting it into lengths to form studs, welding members having jaws for the application of a part of the welding pressure to the studs and for the supply of the welding current to the studs, and an abutment in said seizing and cutting means for engaging the rear of the stud to prevent it from sliding between the welding members during the welding operation.

2. Apparatus for welding under pressure, to a curved or plane surface, studs or bolts cut from a continuous metal wire, comprising in one unit, means for guiding and straightening the wire, means for gripping the wire and cutting it into lengths to form the studs, welding tongs having jaws for the application of welding pressure to the studs, a cylinder, a piston rod extending from the cylinder and carrying the said gripping means, pivoted cylinder and piston means for opening and closing said gripping means, and means for the supply of welding current to the studs.

3. Apparatus for welding to a metal surface, studs cut from a continuous metal wire, comprising in one unit, means for guiding and straightening the wire, means for gripping the wire and cutting it into lengths to form the studs, welding tongs for the application of welding pressure to the studs, a piston rod, means for imparting longitudinal movement to said rod, means for mounting the welding tongs in longitudinally adjustable position on said piston rod, and means for the supply of welding current to the studs.

4. Apparatus for welding to a metal surface, studs cut from a metal wire, comprising in one unit, means for guiding the wire through the apparatus, means for straightening the wire, means for gripping the wire and cutting it into lengths to form the studs, welding tongs for the application of welding pressure to the studs, a piston rod carrying the said wire gripping and cutting means, means for applying moderate pressure to the gripping means to securely grip the wire during the forward movement thereof and for applying greater pressure to said gripping means to cut off the end of the wire to form the studs, and means for the supply of welding current to the studs.

5. Apparatus for welding to a metal surface, studs cut from a continuous metal wire, comprising in one unit, means for guiding and straightening the wire, means for gripping the wire and cutting it into lengths to form the studs, welding tongs for the application of welding pressure to the studs, adjustable stop means for preventing the said gripping and cutting means from severing the wire during the forward movement of the wire by said means before the end of the wire has advanced to the welding position, and means for the supply of welding current to the studs.

6. Apparatus for welding to a metal surface, studs cut from a continuous metal wire, comprising in one unit, means for guiding the wire through the apparatus, means for straightening the wire, means for gripping the wire and cutting it into lengths to form the studs, welding tongs having jaws for the application of welding pressure to the studs, means whereby the wire is advanced by said gripping means until it is in welding position, means whereby the wire is then gripped by the welding tongs and whereby the end of the wire is then cut off and the cutting means act as an abutment for the cut end of the stud, and means for the supply of the welding pressure and of the welding current to the studs.

7. Apparatus for welding to a metal surface, studs cut from a continuous metal wire, comprising in one unit, means for guiding the wire through the apparatus, means for straightening the wire, means for gripping the wire and cutting it into lengths to form the studs, welding jaws for the application of welding pressure to the studs, means whereby the stud is cut from the wire by said gripping and cutting means just before the stud engages the surface to which it is to be welded, and means for the supply of welding current to the stud.

8. Apparatus for welding to a metal surface, studs cut from a metal wire, comprising in one unit, means for guiding and straightening the wire, means for gripping the wire and cutting it into lengths to form the studs, welding tongs for the application of welding pressure to the studs, a piston for the actuation of the welding tongs, means for adjusting the tongs longitudinally upon the piston to vary the length of the studs to be cut from the wire, and means for the supply of welding current to the studs.

9. Apparatus for welding to a metal surface, studs cut from a metal wire, comprising in one unit, means for guiding and straightening the wire, means for gripping the wire and cutting it into lengths to form the studs, welding tongs for the application of welding pressure to the studs, a piston and cylinder, a piston rod carried by said piston for the actuation of the welding tongs, means for adjusting the tongs longitudinally upon the piston to vary the length of the studs to be cut from the wire, a frame for said cylinder, means for adjusting the cylinder axially with respect to said frame to adjust the tongs longitudinally, and means for the supply of welding current to the studs.

10. Apparatus for welding to a metal surface, studs cut from a continuous metal wire, comprising in one unit, means for guiding and straightening the wire, means for gripping the wire and cutting it into lengths to form the studs, welding tongs having jaws for the application of welding pressure to the studs, a hollow piston rod carrying said gripping and cutting means and said welding tongs, a cylinder for said piston, means for limiting the return movement of the piston rod in said cylinder, and means for the supply of welding current to the studs.

11. Apparatus according to claim 1, comprising fluid pressure means whereby said cutting means initially penetrates the wire and whereby a high fluid pressure is applied to said cutting means to completely sever the wire and separate the stud therefrom after the stud has been advanced towards the welding position.

12. Twin welding apparatus according to claim 1 for welding two studs simultaneously to the opposite surfaces of a workpiece in the form of a sheet, comprising auxiliary electric contacts on the opposing apparatus for making contact with the workpiece directly opposite each other.

13. Twin welding apparatus according to claim 1 for welding two studs simultaneously to the opposite surfaces of a workpiece in the form of a sheet, comprising auxiliary electric contacts on the two opposed apparatus for contact with each other beyond the edge of the workpiece sheet when the studs are welded near the edge of the sheet.

14. Apparatus for butt welding to a metallic surface, the ends of studs cut successively from the leading end of an advancing wire, comprising front and rear means for gripping the wire, means for moving both said means to advance the wire towards said surface, means for actuating said rear means to partially penetrate the wire during said advancing movement and to completely sever the stud from the wire after said movement, and means for supplying electric current to the stud through the said front means during the welding operation.

15. Apparatus for butt welding to a metallic surface, the ends of studs cut successively from the leading end of an advancing wire, comprising front and rear means for engaging and gripping the wire, fluid pressure means for moving said rear means to advance the wire towards said surface, fluid pressure means for actuating said rear means to partially penetrate the wire during said advancing movement and to completely sever the stud from the wire after said movement, fluid pressure means for holding said front means in close contact with the wire, and means for the supply of electric current to the studs through said front means during the welding operation.

16. Apparatus according to claim 1, comprising an auxiliary contact for making electric contact with the workpiece, and an electric current source with one pole connected to said auxiliary contact and the other connected to said jaws.

17. Apparatus according to claim 1, comprising an auxiliary electric contact carried by the apparatus in close proximity to and spaced from said jaws, said contact making electric contact with the surface of the workpiece while the jaws make electric contact with the stud, and a current source with one pole connected to said jaws and the other connected to said auxiliary contact to supply the welding current through the stud.

18. Apparatus for the electric butt welding of metallic studs formed from wire material to a curved or plane surface of a workpiece, comprising, in one unit, means actuated by fluid pressure for seizing and straightening the wire material and for advancing it towards the workpiece and for cutting it into lengths to form the studs, welding members with jaws for the application of a part of the welding pressure to the studs and for the supply of the welding current to the studs, and abutment means in said seizing and cutting means for engaging the rear end of the stud for the application of the main welding pressure thereto and to prevent the stud from sliding between the jaws of the welding members during the welding operation.

References Cited in the file of this patent

UNITED STATES PATENTS

| Number | Name | Date |
| --- | --- | --- |
| Re. 20,348 | Hoffer | May 4, 1937 |
| 705,130 | Perry | July 22, 1902 |
| 1,221,555 | McClelland | Apr. 3, 1917 |
| 1,685,439 | Strout | Sept. 25, 1928 |
| 2,018,379 | Pfeiffer | Oct. 22, 1935 |
| 2,339,884 | Schlumpf | Jan. 25, 1944 |
| 2,473,543 | Randolph | June 21, 1949 |
| 2,542,093 | Rasmusen | Feb. 20, 1951 |